(12) United States Patent
Willhite et al.

(10) Patent No.: US 7,095,713 B2
(45) Date of Patent: Aug. 22, 2006

(54) NETWORK FABRIC ACCESS DEVICE WITH MULTIPLE SYSTEM SIDE INTERFACES

(75) Inventors: Nelson Willhite, Sunnyvale, CA (US); Mike Noll, San Jose, CA (US); Robert Steven Martin, Los Gatos, CA (US); Akhil Duggal, Los Altos, CA (US); Craig Lindberg, Nevada City, CA (US); Thomas Carleton Jones, San Jose, CA (US); Srinivas Komidi, San Jose, CA (US)

(73) Assignee: Alcatel IP Networks, Inc., Plano, TX (US)

( * ) Notice: Subject to any disclaimer, the term of this patent is extended or adjusted under 35 U.S.C. 154(b) by 0 days.

(21) Appl. No.: 10/831,711

(22) Filed: Apr. 23, 2004

(65) Prior Publication Data
US 2004/0213292 A1 Oct. 28, 2004

Related U.S. Application Data

(60) Provisional application No. 60/465,654, filed on Apr. 25, 2003.

(51) Int. Cl.
G01R 31/08 (2006.01)

(52) U.S. Cl. .......... 370/219; 370/220; 370/228
(58) Field of Classification Search .......... 370/217, 370/218, 219, 220, 221, 225, 227
See application file for complete search history.

(56) References Cited

U.S. PATENT DOCUMENTS

| | | | |
|---|---|---|---|
| 5,303,078 A | 4/1994 | Brackett et al. | |
| 5,367,520 A * | 11/1994 | Cordell | 370/395.71 |
| 5,574,718 A * | 11/1996 | Eckhoff et al. | 370/228 |
| 5,732,085 A * | 3/1998 | Kim et al. | 370/398 |
| 5,777,984 A | 7/1998 | Gun et al. | |
| 6,038,211 A * | 3/2000 | Lemaire | 370/216 |
| 6,061,328 A * | 5/2000 | Read et al. | 370/216 |
| 6,067,286 A | 5/2000 | Jones et al. | |
| 6,178,169 B1 * | 1/2001 | Hodgkinson et al. | 370/395.52 |
| 6,188,667 B1 * | 2/2001 | Roberts et al. | 370/219 |
| 6,259,693 B1 | 7/2001 | Ganmukhi et al. | |
| 6,359,858 B1 * | 3/2002 | Smith et al. | 370/217 |
| 6,366,557 B1 * | 4/2002 | Hunter | 370/217 |
| 6,370,294 B1 | 4/2002 | Pfeiffer et al. | |
| 6,483,850 B1 | 11/2002 | Chui et al. | |
| 6,484,209 B1 | 11/2002 | Momirov | |
| 6,778,490 B1 * | 8/2004 | Achilles et al. | 370/217 |

OTHER PUBLICATIONS

Tanabe et al., A New Distributed Switching System Architecture for B-ISDN.

* cited by examiner

*Primary Examiner*—Chau Nguyen
*Assistant Examiner*—Ian N. Moore
(74) *Attorney, Agent, or Firm*—Van Pelt, Yi & James LLP

(57) ABSTRACT

A fabric access device having a plurality of system interfaces is disclosed. The fabric access device includes a fabric interface configured to receive data from and send data to a switch fabric and a routing circuit configured to send data received on one of the plurality of system interfaces to the switch fabric via the fabric interface. The inclusion of a plurality of system interfaces facilitates a variety of configurations that provide different levels of redundancy and optimize use of available bandwidth.

6 Claims, 5 Drawing Sheets

NETWORK FABRIC ACCESS DEVICE WITH MULTIPLE SYSTEM SIDE INTERFACES

CROSS REFERENCE TO RELATED APPLICATIONS

This application claims priority to U.S. Provisional Patent Application No. 60/465,654 entitled NETWORK SWITCH FABRIC ACCESS INTEGRATED CIRCUIT filed Apr. 25, 2003, which is incorporated herein by reference for all purposes.

FIELD OF THE INVENTION

The present invention relates generally to data networking. More specifically, a switch fabric access device with two system side interfaces is disclosed.

BACKGROUND OF THE INVENTION

In data communication networks, devices such as routers and switches are typically used to transfer data from a source to a destination. Existing switching systems often employ a switch fabric for switching data from source ports (also referred to as input ports) to destination ports (also referred to as output ports).

Fabric access devices are commonly used to manage data between the switch fabric and the rest of the system. A fabric access device may perform functions such as data buffering, data prioritization, redundancy management, etc. A typical fabric access device includes a single system interface configured to receive data from and send data to an external system or port. The configuration of such devices tends to have limited flexibility. For example, if redundancy is required, the fabric access device is typically connected to the switch fabric via two fabric interfaces. During normal operation, one of the fabric interfaces is active, and the other fabric interface is standing by. If the active fabric interface fails, the standby fabric interface takes over and continues to transfer data between the fabric access node and the switch fabric. Since twice the bandwidth on the fabric interface is required to service the bandwidth available on the system interface, such a configuration is said to provide full 2:1 redundancy. This approach is useful for providing a high level of redundancy since in the event that all of the active fabric interface links are lost, as long as the standby links can take over in time, no data will be lost. However, the highly redundant configuration also means that half of the available bandwidth on the fabric access interface remain idle in standby mode much of the time, resulting in inefficient utilization of bandwidth. In systems with less stringent redundancy requirements, it would be desirable if the fabric access device could allow more flexible configurations. For example, it may be useful to have fewer than half of the available interface links for redundancy purposes so that the available bandwidth is more efficiently utilized.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A fabric access device with two or more system side interfaces is disclosed. In some embodiments, the fabric access device includes a plurality of system interfaces and a routing circuit. In one mode, the routing circuit is configured to send data received on one of the plurality of system interfaces via a fabric interface to a switch fabric. In some embodiments, the routing circuit is configured to send data received on a first one of the plurality of system interfaces via a second one of the plurality of system interfaces. The fabric access device is configurable to offer different levels of redundancy and utilization of the available capacity.

Figure 1:
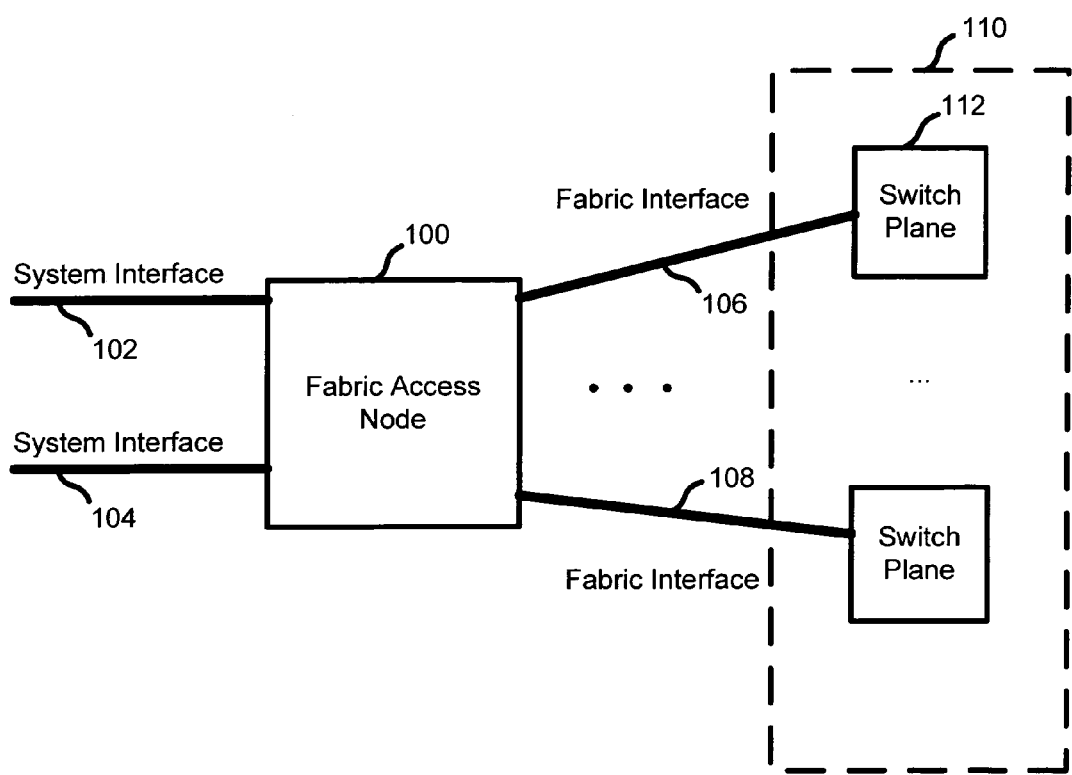
FIG. 1 is a block diagram illustrating a fabric access device configuration according to some embodiments.

FIG. 1 is a block diagram illustrating a fabric access device configuration according to some embodiments. In this example, the fabric access device includes a fabric access node 100, a plurality of system interfaces (such as 102 and 104), and one or more fabric interfaces (such as 106 and 108). For the purpose of illustration, two interfaces per fabric access device are shown in FIG. 1 and discussed in the following discussion, although fewer or more interfaces may be included in some embodiments. Each interface may include multiple physical links. The fabric access device allows flexible mapping between its interfaces. The fabric access node includes a routing circuit (not shown) that is configurable to pass traffic between the two system interfaces (in a "loop back" mode) as well as to pass traffic between the system interfaces and the fabric interfaces. The fabric access node is capable of performing functions such as buffering input data, scheduling data to be transmitted, mapping system interface links and fabric interface links, mapping one set of system interface links to another set of system interface links, etc.

In the example shown, the fabric access node 100 is configured to associate system interface links and fabric interface links, thus allowing data to be transferred from a system interface link to an appropriate fabric interface link and vice versa. The system interfaces and fabric interfaces are represented with thick solid lines to indicate that each of the interfaces may include more than one physical link. Each of the system interfaces is configured to receive data from and send data to one or more external systems such as another fabric access device, an input/output module, one or more system ports, etc. The fabric interfaces are configured to send data to and from a switch fabric 110. Multiple fabric access nodes may be connected to the switch fabric in some embodiments. In this example, the switch fabric includes multiple switch planes such as 112. Each fabric interface may be coupled to one or more switch planes.

The flexible mapping allows the capacity of the fabric switch to be more efficiently used and support a wide range of applications. The fabric access device may be configured to support a high level of redundancy in some embodiments. For example, the fabric interfaces support twice the capacity of the system interfaces in some embodiments. All the links in the fabric interfaces are used to service traffic. If any of the fabric interfaces fails (that is, if the hardware, software or combination thereof associated with the interface itself fails, or if the links associated with the fabric interface become unavailable (due to, for example, failure in the switch fabric)), data is routed to be sent via the remaining, available links and not through the failed link. In the event of link failure, the system continues to function even if up to half of the total links have failed. Thus, 2:1 redundancy is provided.

The system may be reconfigured to more efficiently utilize the available capacity for applications that do not require such a high level of redundancy. In some embodiments, the capacity of the fabric interfaces is less than twice that of the system interfaces. For example, in an "N−1" redundancy system (assuming N links per system interface), the capacity of the fabric interfaces may be equal to that of the system interfaces. If an active fabric interface link fails, traffic is rerouted to the remaining links to prevent data loss. Such systems exhibit graceful performance degradation in the event of failure. Different traffic rerouting techniques may be adopted depending on the implementation.

Fabric access devices with multiple system interfaces may also offering improved scalability. Previously, the number of ports supported by a switch fabric is determined by the number of fabric ports, since each fabric port only has access to one set of system interfaces. If a fabric access device allows each fabric port to connect to two system interfaces, then the total number of ports supported by the system is doubled.

Figure 2A:
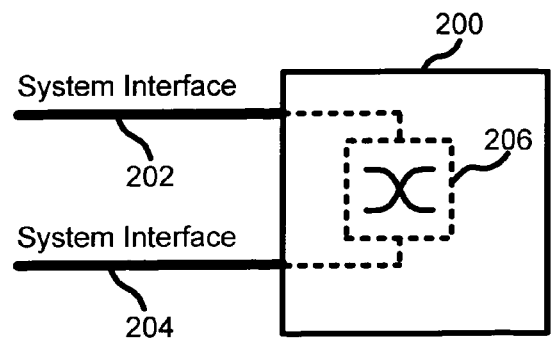
FIG. 2A is a block diagram illustrating an example of a fabric access device configured in loop back mode.

Fabric access devices with multiple system interfaces may operate without being connected to a switch fabric. FIG. 2A is a block diagram illustrating an example of a fabric access device configured in loop back mode. In this example, fabric access node 200 is configured to route cells received on system interface 202 or system interface 204 to the other of system interfaces 202 and 204 via routing (or mapping) circuit 206. This configuration may be a software programmable feature that is enabled in some embodiments. Without connections to the switch fabric, fabric access node 200 acts as a two port switch in this configuration. Such a configuration allows two system ports to be serviced by a single fabric access device without requiring any separate switch fabric devices or circuits.

Figure 2B:
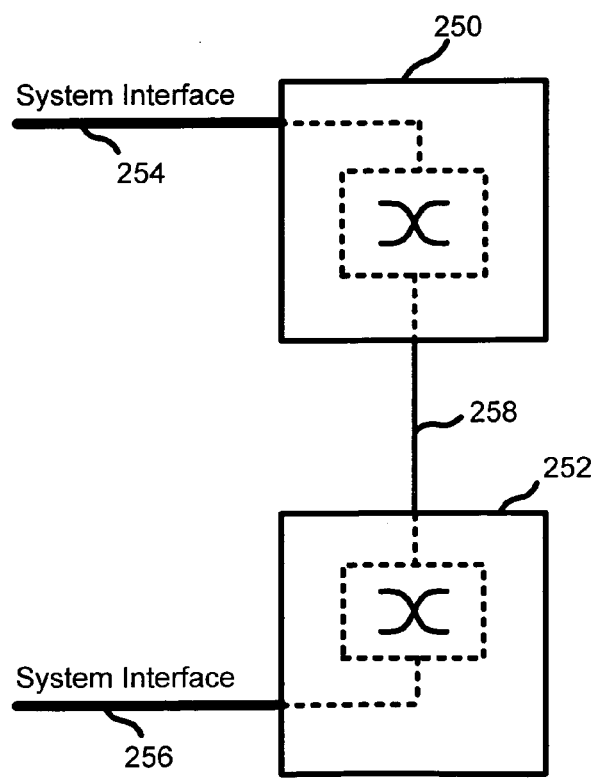
FIG. 2B is a block diagram illustrating another example configuration that includes two fabric access devices.

FIG. 2B is a block diagram illustrating another example configuration that includes two fabric access devices. In this example, two fabric access nodes 250 and 252 are configured in a loop back configuration. Two system interfaces, one from each fabric access node, are coupled to form interface 258. Fabric access nodes 250 and 252 perform mapping operations among the interface links and switch data among the system interface links.

Figure 3:
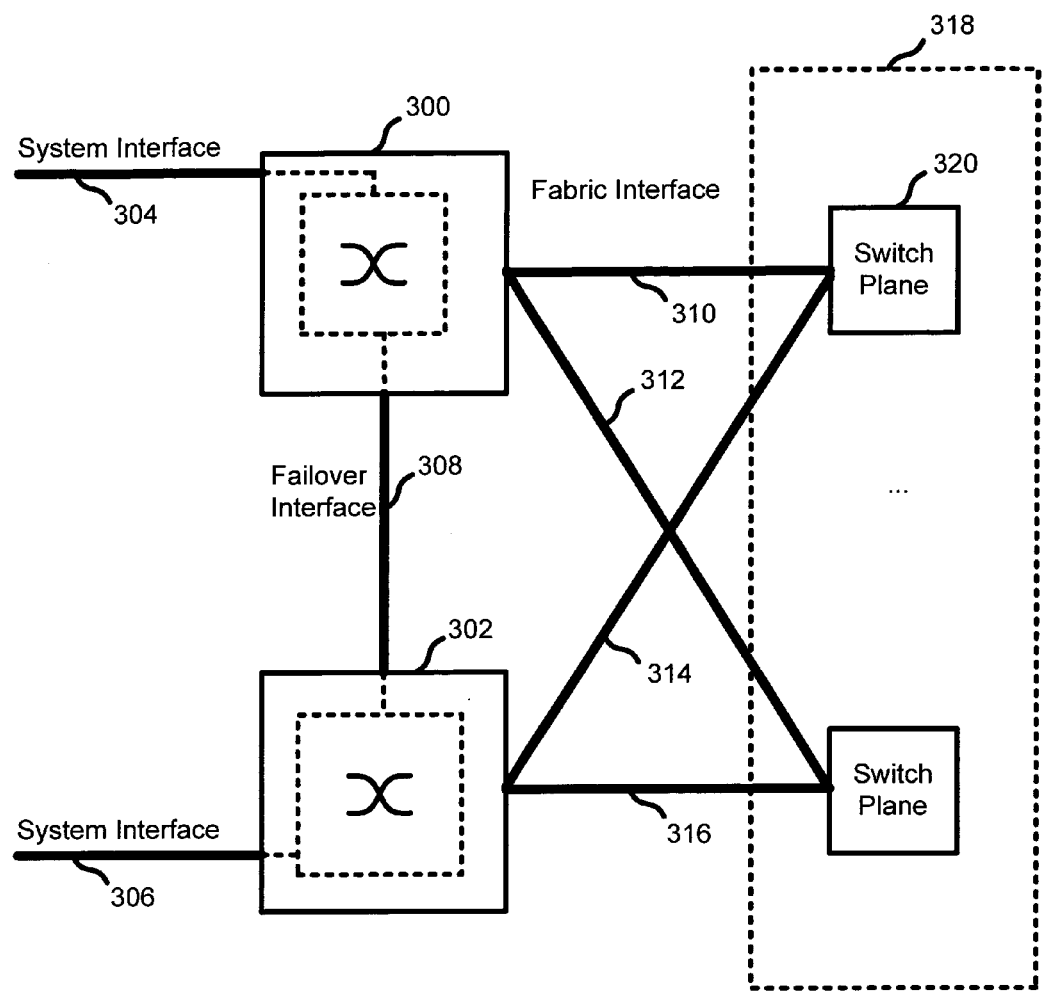
FIG. 3 is a block diagram illustrating another example configuration of two fabric access devices according to some embodiments.

FIG. 3 is a block diagram illustrating another example configuration of two fabric access devices according to some embodiments. In this example, two fabric access nodes 300 and 302 are coupled to switch fabric 318 via fabric interfaces 310–316. The fabric interfaces are connected to a plurality of switch planes such as switch plane 320. The fabric access nodes are coupled to one or more external systems via system interfaces 304 and 306. A failover interface 308 is formed by connecting the remaining system interfaces of each of the fabric access nodes. During normal operation, the failover interface is not used. If, however, one of the fabric access nodes experiences failure in its connection to the switch fabric, data associated with the fabric access node that has lost its connections to the switch fabric is then handled by the other fabric access node via the failover interface. Details of the failover are discussed below. The configuration shown in this example offer a broader range of redundancy options, and allows the fabric interface links to be utilized more efficiently.

Figure 4:
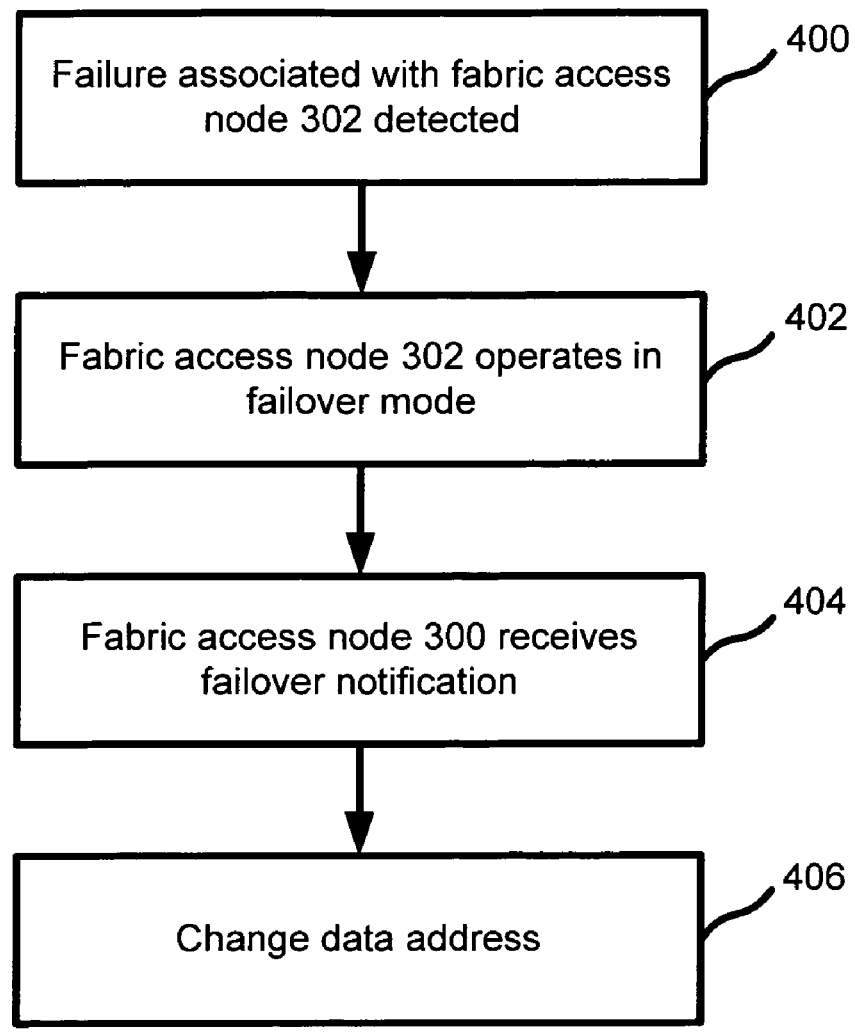
FIG. 4 is a flowchart illustrating a failover process according to the embodiment shown in FIG. 3.

FIG. 4 is a flowchart illustrating a failover process according to the embodiment shown in FIG. 3. For the purpose of example, it is assumed that fabric access node 302 has failed. Once the failure is detected (400), fabric access node 302 enters a failover mode (402) where it forwards data received on system interface 306 via failover interface 308 to fabric access node 300 so that data may be sent to the appropriate fabric interface. Fabric access node 300 also receives a failover notification (404). When node 302 is in the failover mode, active fabric access node 300 handles data originally associated with fabric access node 302. For example, active node 300 receives ingress cells via failover interface 308 and sends them via appropriate links into the switch fabric on behalf of node 302 to be switched to their destination. For egress cells received from the switch fabric, active node 300 recognizes egress cells associated with failed node 302 (e.g., by an additional bit in the cell address, as described more fully below) and routes those cells to node 302 via failover interface 308 for delivery to their respective destinations via system interface 306.

In order to comply with data access protocols and to ensure that data is delivered to the appropriate destinations, the address of data may be changed (406) so that the appropriate path is chosen. For example, in one embodiment, when not in failover mode a five bit field in the header of a data cell is used to designate the address of the fabric access node to which a particular cell is being sent (e.g., in an embodiment with 32 logical ports). Fabric access node 300 may be represented as 00000 and fabric access node 302 may be represented as 00001. When failover occurs, data received on system interface 306 is sent via the failover interface 308 to fabric access node 300 to be forwarded, and data destined for system ports associated with system interface 306 is sent to fabric access node 300 to be forwarded via the failover interface 308 to fabric access node 302, and subsequently system interface 306. To achieve proper data addressing, in some embodiments the source address of data originating from system interface 306 is set to 00000 instead of 00001. In some embodiments, address data in the data (e.g., cell) itself is not changed, but the switch fabric associates the data with address 00000 because it is received by the switch fabric via a link associated with that address. Thus, from the perspective of the switch fabric, all incoming data is sent by address 00000 via fabric access node 300, therefore any response data should also be sent to the same address via fabric access node 300. In some embodiments, an auxiliary address field is used to distinguish the origin of the data. The auxiliary address field may include one or more additional bits for identifying the fabric access node with which data is associated. For example, auxiliary addresses of 0 or 1, e.g., an additional bit added to the five-bit address described above may be used to indicate that data is associated with fabric access node 300 or 302, respectively. The fabric access node can use the auxiliary address to determine whether data is to be forwarded via the failover interface to the other fabric access node. For example, node 300 may be configured in one embodiment to send data cells addressed to port 000000 out a first (e.g., primary) system interface and data cells addressed to port 100000 out a second system interface, e.g., a failover interface to port 302. In some embodiments, the switch fabric may be configured such that in the event a node such as node 302 loses its direct connections to the fabric cells to be sent to the port are redirected to the failover port (e.g., node 300) and the port address changed as required to enable the failover port to recognize the cell as being associated with the failed port.

Figure 5:
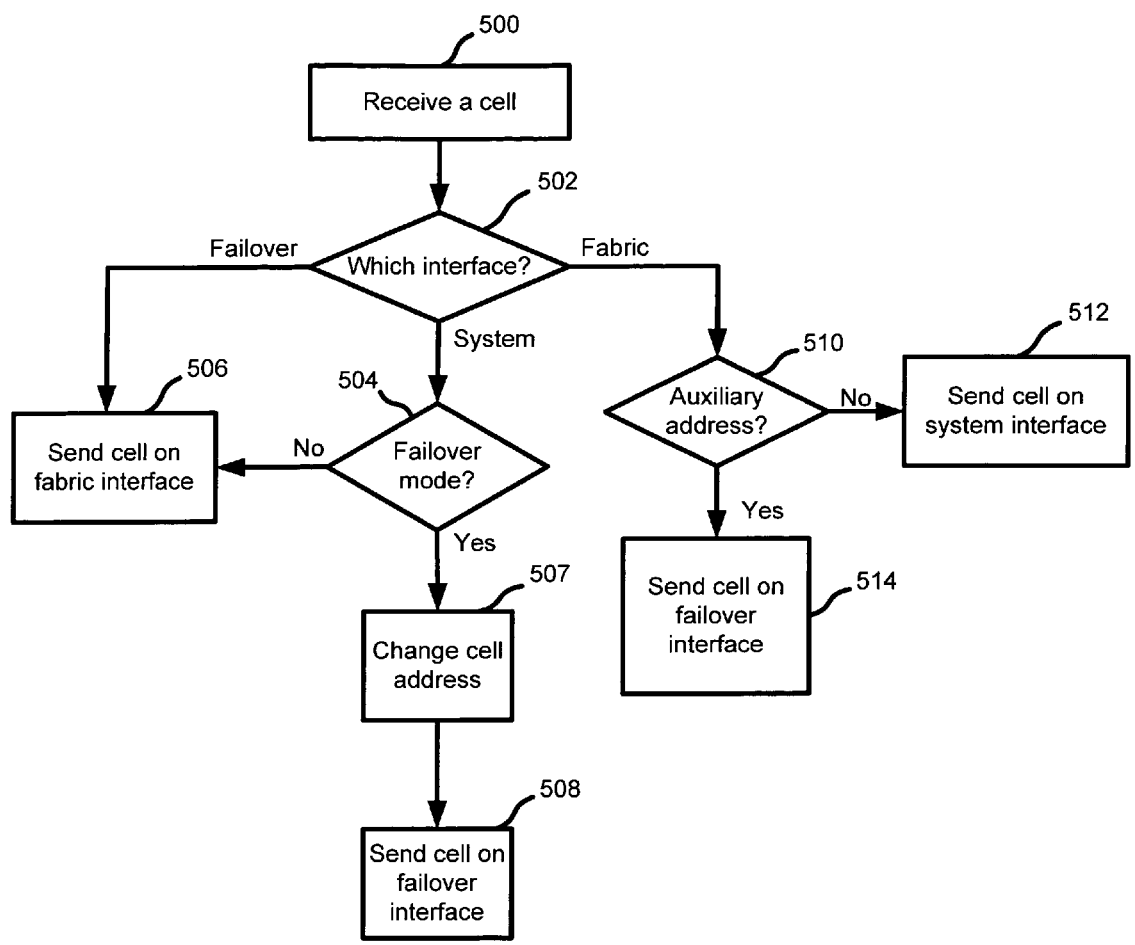
FIG. 5 is a flowchart illustrating the processing of a data cell received by the fabric access node, according to some embodiments.

FIG. 5 is a flowchart illustrating the processing of a data cell received by the fabric access node, according to some embodiments. For the purpose of clarity, in this example, the fabric access node on which the cell is received is referred to as the current fabric access node. Either the current fabric access node or the other fabric access node may be operating in failover mode.

In this example, a cell is received by the current fabric access node (500). It is then determined on which interface the cell is received (502). If the cell is received on the failover interface, it indicates that the other fabric access node has detected failure on its fabric interfaces, therefore data has been forwarded via the failover interface to the current fabric access node. The cell is then sent to the switch fabric via the fabric interface (506).

If the cell is received on the system interface, it indicates that the cell is sent from the external system to be switched by the switch fabric. It is then determined whether the current fabric access node is in failover mode. If the node is in failover mode, any appropriate change in the cell's address is made (507) and the cell is forwarded to the other active fabric access node via the failover interface (508). If the current node is not in failover mode, the cell is forwarded to the switch fabric via the fabric interface (506).

If the cell is received on the fabric interface, it is determined whether it includes an auxiliary address designation for the other fabric access node. If such an auxiliary address designation is present, the cell is forwarded via the failover interface to the other fabric access node and ultimately to the external system. Otherwise, the cell is sent to the external system via the system interface associated with the current fabric access node (512).

A fabric access device with multiple system interfaces has been disclosed. The approach is applicable to both striped architectures where data cells are segmented before they are transferred, and non-striped architectures where whole cells are transferred. Besides cells, other appropriate units of data transfer such as packets, frames, etc. may also be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A fabric access system comprising:
    a first fabric access device comprising:
        a first system interface configured to receive data from and send data to a first external system;
        a second system interface; and
        a first fabric interface configured to receive data from and send data to a switch fabric;
    a second fabric access device coupled to the first fabric access device, comprising:
        a third system interface configured to receive data from and send data to a second external system;
        a fourth system interface connected to said second system interface of said first fabric access device; and
        a second fabric interface configured to receive data from and send data to the switch fabric;
    wherein in the event the second fabric interface or all of its associated links become unavailable for transferring data, the first fabric access device is configured to determine upon receiving data via the first fabric interface whether the data is associated with the first fabric access device or the second fabric access device.

2. A fabric access system as recited in claim 1, wherein the connected second system interface and fourth system interface form a failover interface.

3. A fabric access system as recited in claim 1, wherein in the event the second fabric interface or all of its associated links become unavailable for transferring data, the second fabric access device automatically routes data received on said third system interface to said first fabric access device via said fourth system interface.

4. A fabric access system as recited in claim 1, wherein the first fabric access device is configured to forward to the switch fabric via the first fabric interface any data received on said second system interface.

5. A fabric access system comprising:
    a first fabric access device comprising:
        a first system interface configured to receive data from and send data to a first external system;
        a second system interface; and
        a first fabric interface configured to receive data from and send data to a switch fabric;
    a second fabric access device coupled to the first fabric access device, comprising:
        a third system interface configured to receive data from and send data to a second external system;
        a fourth system interface connected to said second system interface of said first fabric access device; and
        a second fabric interface configured to receive data from and send data to the switch fabric;
    wherein in the event the second fabric interface or all of its associated links become unavailable, the switch fabric is configured to switch data having a destination address associated with a logical port associated with the second fabric access device to a link associated with the first fabric access device.

6. A fabric access system as recited in claim 5, wherein the switch fabric is further configured to include with the data a port address associated with the second fabric access device and the first fabric access device is configured to recognize from the port address that the data is associated with the second fabric access device and send the data to the second fabric access device via the second system interface.

* * * * *